United States Patent
Qin et al.

(10) Patent No.: US 6,513,005 B1
(45) Date of Patent: Jan. 28, 2003

(54) METHOD FOR CORRECTING ERROR CHARACTERS IN RESULTS OF SPEECH RECOGNITION AND SPEECH RECOGNITION SYSTEM USING THE SAME

(75) Inventors: Yong Qin, Beijing (CN); Li Qin Shen, Beijing (CN); Hui Su, Beijing (CN); Donald T. Tang, Mount Kisco, NY (US); Qian Ying Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 166 days.

(21) Appl. No.: 09/624,962

(22) Filed: Jul. 25, 2000

(30) Foreign Application Priority Data

Jul. 27, 1999 (CN) ........................................ 99110695 A (51) Int. Cl.[7] .............................................. G10L 15/04
(52) U.S. Cl. ....................... 704/254; 704/231; 704/251
(58) Field of Search ................................ 704/231, 251, 704/254, 1.1

(56) References Cited

U.S. PATENT DOCUMENTS

| | | | | |
|---|---|---|---|---|
| 5,287,275 A | * | 2/1994 | Kimura | ...................... 382/190 |
| 5,768,422 A | * | 6/1998 | Yaeger | ........................ 382/157 |
| 5,883,986 A | * | 3/1999 | Kopec et al. | ............... 382/155 |
| 6,340,967 B1 | * | 1/2002 | Maxted | ....................... 345/156 |
| 6,393,395 B1 | * | 5/2002 | Guha et al. | .................. 382/186 |

OTHER PUBLICATIONS

Chiang et al, "On Jointyl Learning the Parameter in a Character Synchronous Integrated Speed and Language Model", IEEE Transactions on Speech and Audio Processing, May 3, 1996, pp 167–189.*

Yang et al, "Statistics–Based Segment PAttern Lexicon—A New Direction for Chinese Language Modeling", IEEE ICASP, vol. 1 pp 169–172.*

Wang et al, "Complete Recognition of Continuous Mandarin Speech for Chinese Language with Very Large Vocabulary Using Limited Training Data", IEEE Transactions on Speech and Audio Processing, Mar. 1997,vol. 5 #3, pp. 195–200+.*

* cited by examiner

*Primary Examiner*—Vijay B. Chawan
*Assistant Examiner*—Michael N. Opsasnick
(74) *Attorney, Agent, or Firm*—Paul J. Otterstedt (57) ABSTRACT

The invention discloses a method for correcting one or more error characters in results of speech recognition, the method comprising the steps of: marking the one or more error characters in the speech recognition results; inputting one or more correct characters corresponding to the one or more marked error characters by input based on character-shape; recognizing the input based on character-shape; displaying one or more candidate characters; selecting one or more desired characters from the one or more candidate characters in accordance with the user; and replacing the one or more error characters with the one or more selected characters; the method characterized by further comprising the step of filtering the one or more candidate characters in accordance with acoustic information associated with the one or more error characters.

22 Claims, 5 Drawing Sheets

METHOD FOR CORRECTING ERROR CHARACTERS IN RESULTS OF SPEECH RECOGNITION AND SPEECH RECOGNITION SYSTEM USING THE SAME

FIELD OF THE INVENTION

The invention relates to speech recognition technology and, more particularly, to a method for correcting error characters in results of speech recognition and a speech recognition system using the same.

BACKGROUND OF THE INVENTION

Speech recognition technology is a technology for accurately recognizing human speech (for example, character, word, sub-sentence, sentence, etc.) by using computer and digital signal processing technology. Speech recognition is based on collecting the various valuable speech characteristics to be recognized, forming the acoustic model to be recognized, and comparing with the sample model stored in the computer, as well as recognizing what are the characters and words through pattern classification methods. The speech recognition process is a recognition process for syllable or word language composition, etc. No doubt speech recognition is a fast and effective way to input text into a computer. Though a great deal of research for speech recognition has been performed until now, recognition in continuous speech, speaker independent, and long word is in the exploring stage because of the complexity of the language. Thus, error correction for the results of speech recognition is an indispensable step, because the accuracy of speech recognition can never reach 100%.

Friendliness and efficiency of the alternative input methods in the error correction process is very important since it is a part of the complete speech input process, and it can be a deciding factor regarding user's acceptance of the speech input methods. Generally, different input methods such as handwriting input or various types of stroke-based input have been used to correct the error characters in the results associated with speech recognition because the users of the speech recognition system often do not want to use a keyboard or are not familiar with it, and these users more desirably use the stroke-based handwriting input methods, such as handwriting input, stroke-based input or stroke type-based input, which are approximate to the natural handwriting habits. However, such handwriting recognition technology is not a mature technology, thus the error correction efficiency for the results of speech recognition is reduced. The current various error correction methods so far used for the results of speech recognition do not taken advantage of the useful acoustic information generated from the speech recognition process.

SUMMARY OF THE INVENTION

An object of the invention is to use effectively the useful acoustic information generated from the speech recognition process, so as to improve the error correction efficiency of speech recognition, that is, to improve the reliability and speed of the error correction.

The invention fully exploits the useful acoustic information obtained in the speech recognition process to maximize the error correction efficiency for the results associated with speech recognition by using the alternative stroke-based input methods. The invention automatically retains and processes the valuable acoustic information from the speech recognition process. This is accomplished via internal data transfer and incorporation of an evaluation procedure involving several statistical models. The invention uses a confusion matrix to generate an acoustic model, and the acoustic model cooperates with character level and word level language models to optimize the error correction processing.

According to an aspect of the invention, a method for correcting one or more error characters in results of speech recognition comprises the steps of:

marking the one or more error characters in the speech recognition results;

inputting one or more correct characters corresponding to the one or more marked error characters by input based on character-shape;

recognizing the input based on character-shape;

displaying one or more candidate characters;

selecting one or more desired characters from the one or more candidate characters in accordance with the user; and replacing the one or more error characters with the one or more selected characters;

the method characterized by further comprising the step of filtering the one or more candidate characters in accordance with acoustic information associated with the one or more error characters.

According to another aspect of the invention, a speech recognition system capable of correcting one or more error characters in results of speech recognition comprises:

voice detection means for collecting a speech sample of a user;

pronunciation probability calculation means, which, for each pronunciation in an acoustic model, gives a probability estimation value of whether the pronunciation is the same as the speech sample;

word probability calculation means, which, according to a language model, gives a probability estimation value of a word occurring in a current context;

word matching means for calculating a joint probability through combining a probability value calculated by the pronunciation probability calculation means with a probability value calculated by the word probability calculation means and taking the word with the greatest joint probability value as the result of the speech recognition;

context generating means for modifying the current context by using the speech recognition result; and, word output means;

the speech recognition system characterized by further comprising error correction means, user marking the one or more error characters in the results of the speech recognition via the error correction means, inputting one or more correct characters corresponding to the one or more error characters by input based on characters-shape, and the error correction means recognizing the input, generating one or more candidate characters and filtering the one or more candidate characters via acoustic information associated with the one or more error characters.

BRIEF DESCRIPTION OF THE DRAWINGS

These and other objects and features of the invention will become more apparent from the detailed descriptions of the preferred embodiments of the invention in conjunction with the accompanying drawings in which.

DETAILED DESCRIPTION OF PREFERRED EMBODIMENTS

Figure 1:
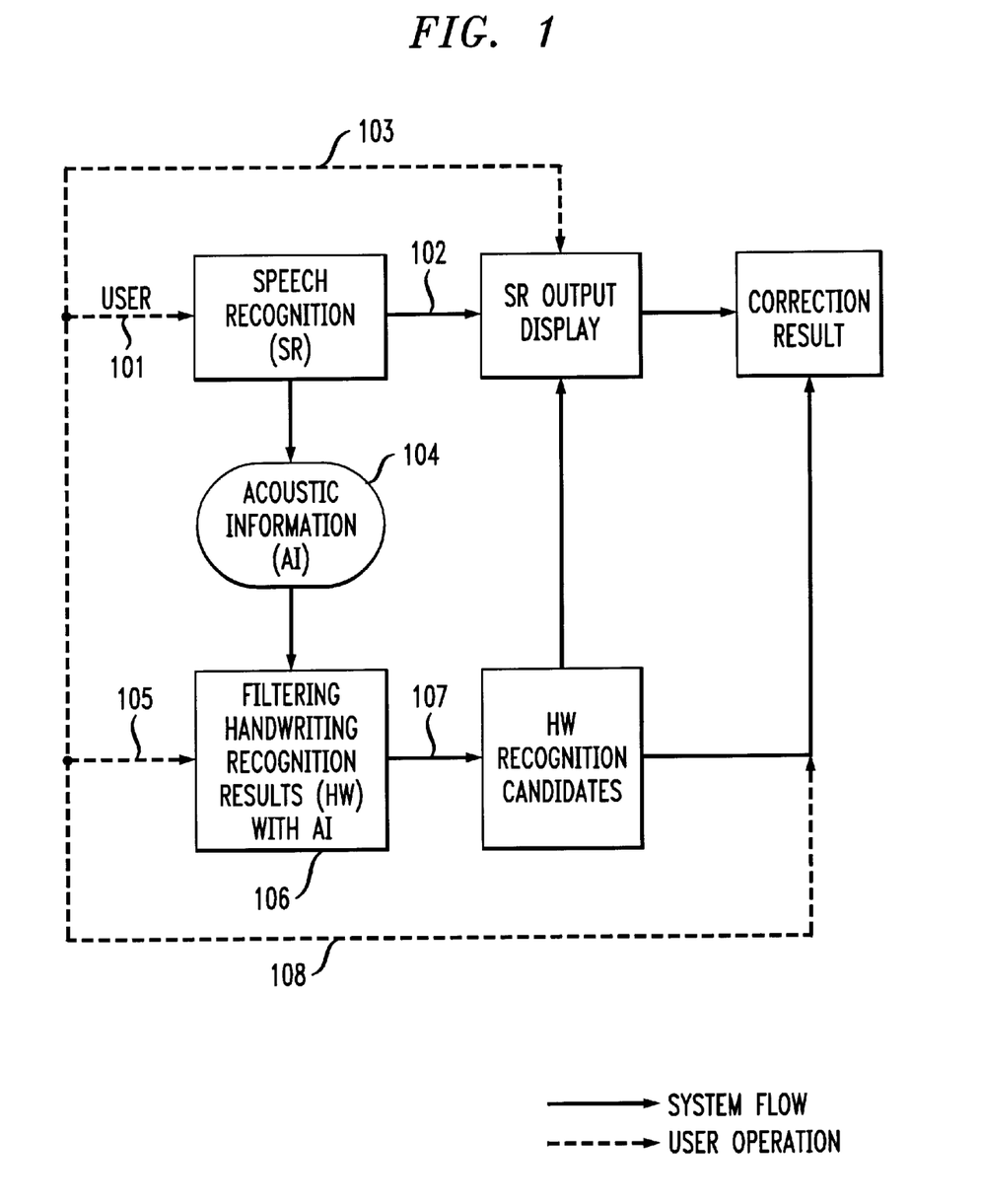
FIG. 1 is a particular operation flow for correcting the error characters in the results of speech recognition according to an embodiment of the invention.

In FIG. 1, there is shown an operation flow for correcting the error characters in the results of speech recognition by handwriting input according to an embodiment of the invention. When error characters are found in the results of the speech recognition, the correction is performed in the following steps:

Step 101: the user performs dictation, and the dictation may be repeated many times to get correct results;

Step 102: the speech recognition (SR) results are displayed on the screen;

Step 103: the user marks the error characters to be corrected;

Step 104: the system uses the acoustic identity of the error characters to retrieve the acoustic information associated with this error (in the form of statistical models) and incorporate it together with language models for ranking or selecting the candidates;

Step 105: with the alternative input methods such as handwriting input methods, the user inputs the correct characters corresponding to the marked error characters;

Step 106: when a recognition step is completed in the alternative input process, the system utilizes the models in Step 104 to rank the current candidate list to achieve better accuracy and speed;

Step 107: the resulting candidate list is displayed either in part or in total on the screen;

Step 108: the user selects the correct characters by the cursor etc.

Figure 2:
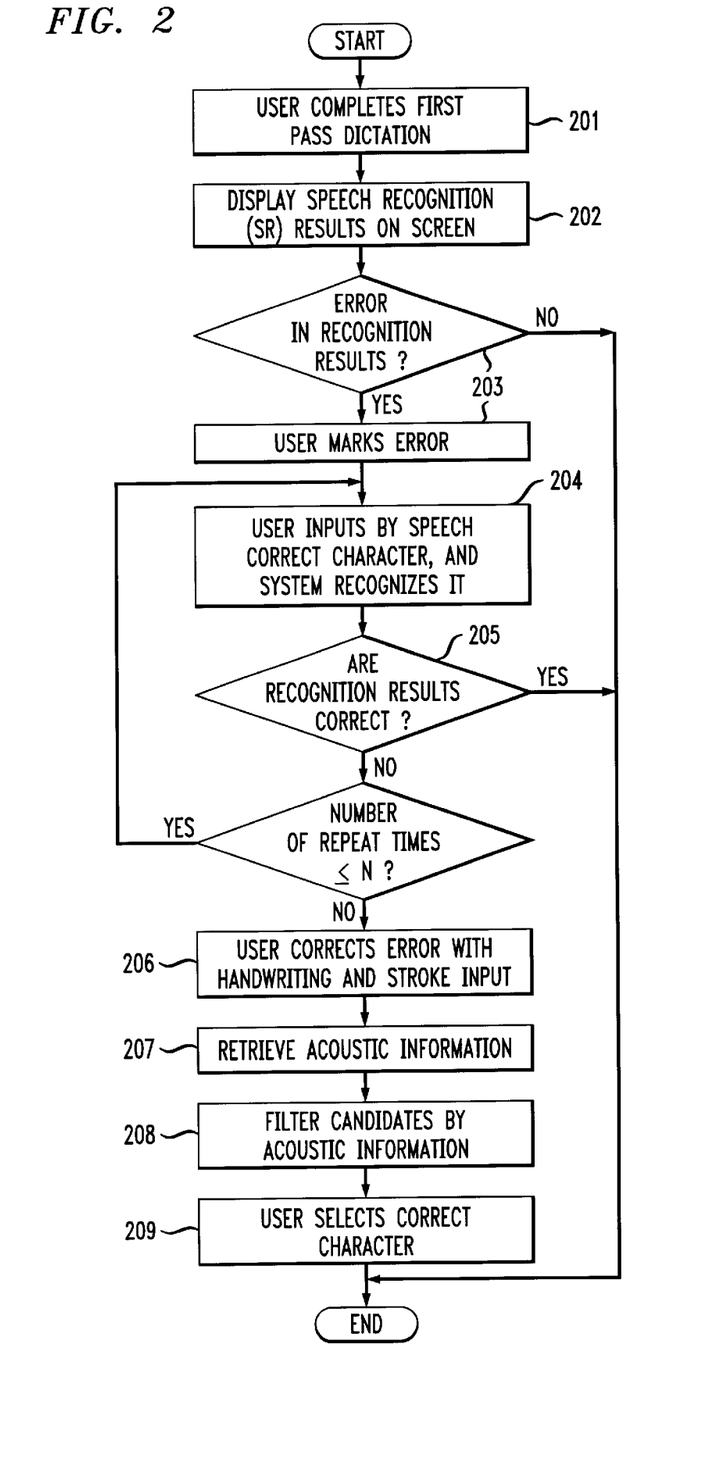
FIG. 2 is a general flow chart of the method of correcting the error characters in the results of speech recognition according to an embodiment of the invention.

FIG. 2 shows the error recovery procedure for the results of speech recognition when using the stroke based keyboard or handwriting inputs. As shown in FIG. 2:

Step 201: the user completes the first pass of dictation;

Step 202: the speech recognition (SR) results are displayed on the screen;

Step 203: the user checks the results. If there are no errors in the recognition results, then no correction is necessary and the input procedure is completed. If there exist one or more errors in the recognition results, the user marks the error to be corrected. This may be a word of multiple characters. The user will typically ask for the candidate list. If the correct character is in the list, the user goes to Step 209, otherwise the user goes to Step 204. This step is repeated for each error in the speech recognition results;

Step 204: the user inputs by speech the correct character (or word) corresponding to the marked error character (or word). The speech recognition machine will decode it with the acoustic model only (i.e., with the language model disabled). If the correct character (or word) appears as a candidate on the screen, the user goes to Step 209;

Step 205: if the character (or word) that appeared on the screen is not correct, the user may choose to repeat Step 204 again;

Step 206: when the error persists, the user begins to input the correct character, that is, to input in the sequence of the strokes of the character;

Step 207: according to the syllable type of this error character from Step 204, the system retrieves the corresponding statistic models associated with this error character from a confusion matrix. These models capture the statistically significant features of the error character, which may consist of the distributions of first Pinyin alphabets and/or the vowels of the error character;

Step 208: the acoustic models obtained from Step 207 are then combined with character and word level language models, leading to a probabilistic evaluation of the likelihood figures of candidate characters (or words) during the sequential stroke input process. These integrated models are used to rank and order the current set of candidates in the stroke based input system for high error correction efficiency;

Step 209: the user selects the correct character needed through clicking, and inputs its order number in the candidate list.

In following, combining with FIG. 3, a process will be described in which, according to a particular embodiment of the invention, the candidate characters are filtered by using the acoustic information obtained from the confusion matrix.

The acoustic information from the speech recognition process is used to rank and order the candidate characters (or words) effectively. It is described in detail as follows for the given error characters (or words) how to collect the acoustic information from the confusion matrix previously generated. It will be also described how to filter the candidate characters (or words) by combining the language model on the basis of the probability statistical model.

First, it will be introduced how to generate a confusion model. A confusion matrix is supposed to be generated in advance from speech input error data, and captures the error probabilities of the all syllables in the continuous speech input.

A syllable set in the Chinese is defined as:

$$SSet=\{S_1, S_2, \ldots, S_N\}$$

In order to get the candidates for each decoded error E, we need to get the probability of each candidate character given the syllables of the decoded characters and its contexts, i. e.:

$$P(C|S_{HE},H)$$

where C means a certain candidate, $S_{HE}$ is the sequence of the syllables of the decoded characters, including the syllable of the decoded error itself and its nearest history, i. e., $S_{HE}=S(H)+S(E)$, where S(H) means the sequence of the syllables of H and S(E) means the syllable of E. H is its history of the language contexts. Then, we rank the candidates according to the value of above probability.

With Bayes's rule, we can get that:

$$P(C \mid S_{HE}, H) = \frac{P(CS_{HE}H)}{P(S_{HE}H)} = \frac{P(S_{HE}H \mid C)P(C)}{P(S_{HE}H)}$$

Because $S_{HE}$ is the pure acoustic and H is pure language events, so we can regard them as independent variables. And $S_{HE}$ and H are determined for a given decoded character. So the above equation can by simplified as:

$$RankP(S_{HE}H \mid C)\frac{P(C)}{P(S_{HE}H)} = RankP(S_{HE} \mid C)P(H \mid C)P(C) \quad (1)$$

$$= Rank\frac{P(C \mid S_{HE})P(C \mid H)}{P(C)}$$

For practical reason, we simplify $P(C|S_{HE})$ as $P(C_S|S_E)$, where $C_S$ represents the syllable of C, $S_E$ is the syllable of the decoded error characters. The simplification indicates we ignore the acoustic context S(H) and group the characters with same syllable into one class.

While training, we take M test speakers, every speaker reads N test sentences. We decode these sentences for these speakers in syllables disregarding language model.

Figure 7:
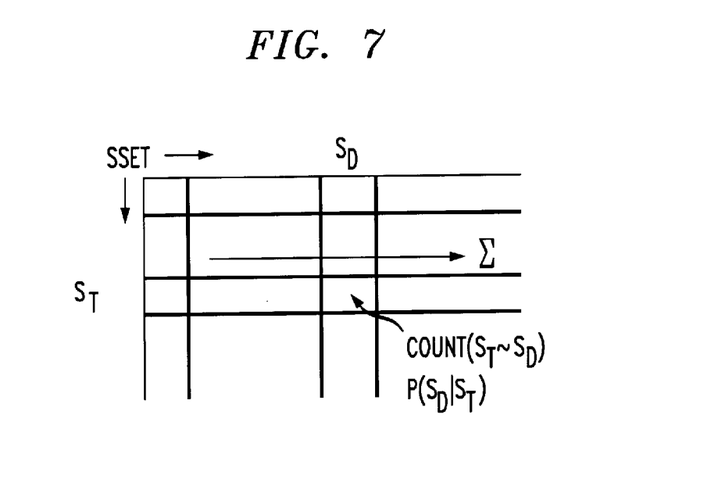
FIG. 7 is an example of a confusion matrix according to an embodiment of the invention.

For each syllable $S_T$ in the test sentences, if it is decoded as $S_D$, where $S_D$ could be $S_T$ itself, we increment Count $(S_T-S_D)$ one step in the confusion matrix shown in FIG. 7. Then we can get the probability of $S_T$ being recognized as $S_D$:

$$P(S_D \mid S_T) = \frac{Count(S_T - S_D)}{\sum Count(S_T - S_M)}$$

for all $S_M \in SSet$ where $S_T, S_D \in SSet$, $Count(S_T-S_D)$ is the times of $S_T$ being recognized as $S_D$, $\Sigma Count(S_T-S_M)$ is the summation of the row $S_T$, which means the total times $S_T$ being recognized as any syllable $S_M \in SSet$. We can save $P(S_D|S_T)$ in the final confusion matrix.

At the same time, we get:

$$P(S_T) = \frac{Count(S_T)}{\sum Count(S_M)} \quad (2)$$

for all $S_M \in$ Training Data

By using the confusion matrix, we are given the decoded syllable $S_D$, and we want to get the probability $S_D$ being from a certain $S_T$, i.e., $P(S_T|S_D)$. With Bayes's rule:

$$P(S_T \mid S_D) = \frac{P(S_D \mid S_T)P(S_T)}{P(S_D)}$$

When we calculate $P(C_S|S_E)$:

$$P(C_S \mid S_E) = P(S_T = C_S \mid S_D = S_E) = \frac{P(S_D = S_E \mid S_T = C_S)P(S_T = C_S)}{P(S_D = S_E)}$$

$P(S_D=S_E)$ is the same for all candidates, so it is no use for ranking. We get $P(S_D=S_E|S_T=C_S)$ and $P(S_T=S_E)$ in equation (2) from the confusion matrix.

While the above approach is suitable for suitable for losing candidates after a user completes his/her speech input the first time and looks for candidates with respect to a particular error character (Step 203 in the error recovery procedure described above), here we focus on the situation that the user has repeated the voice input for an erroneous character but failed, and is ready to use stroke based input method (Step 206). That means the error persisted when the correct word was uttered in a discrete mode.

Therefore, the confusion matrix should be trained by character errors recorded in a discrete speech input environment. Such a confusion matrix can be used together with the language models to rank and order the candidates generated in the stroke input process.

In order to be more robust against inaccuracies in confusion matrix entries (due to insufficient training data, unfamiliar accents, etc.), the following modification of the confusion matrix approach may be used to complement the original confusion matrix method. We may first cluster the syllables into different starting consonant groups (including a group with the starting consonant missing) and generate the consonant confusion matrix in the same way as we described above. We may also cluster the syllables into different vowel groups and generate the vowel confusion matrix. These matrices will give two independent acoustic models, which may be combined with a character (or word) level language model to evaluate the overall likelihood of effective candidates being the correct characters (or words).

Figure 3:
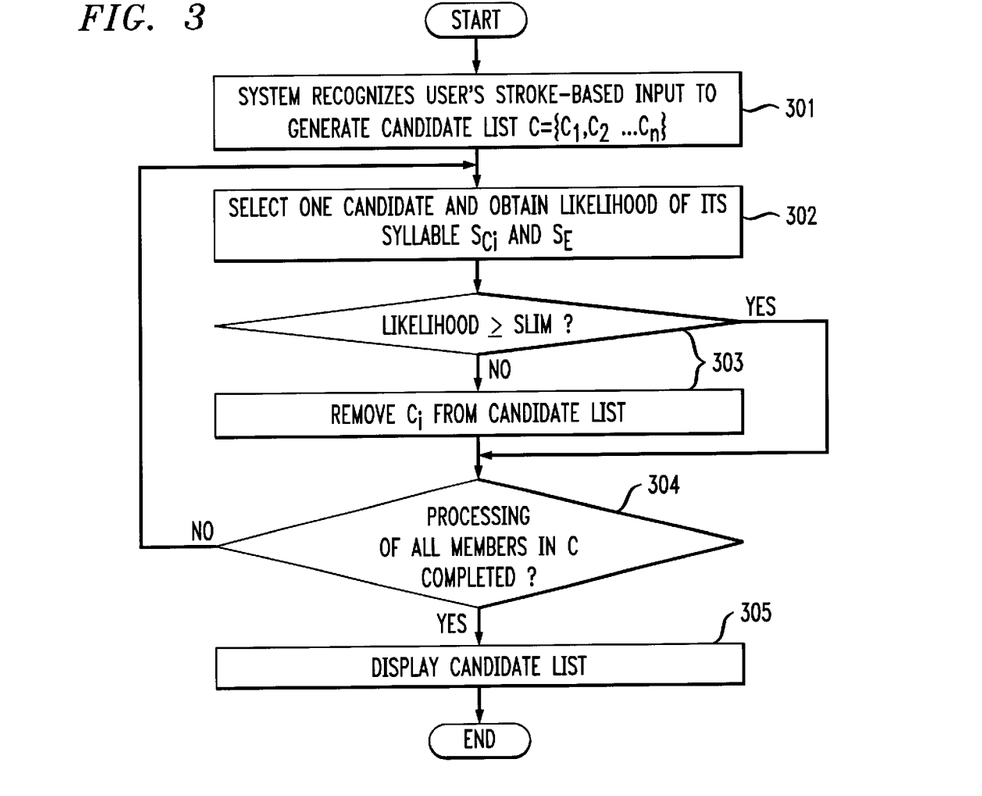
FIG. 3 is a general flow chart for filtering the candidate characters by means of the acoustic information of the error characters obtained from a confusion matrix according to an embodiment of the invention.

FIG. 3 describes a process for filtering the candidate characters by means of the acoustic information obtained from a confusion matrix according to an embodiment of the invention.

Step 301: for the user's stroke-based input, recognition is made to generate a candidate list $C=\{C_1, C_2 \ldots C_n\}$;

Step 302: for every candidate in the candidate list $C=\{C_1, C_2 \ldots C_n\}$, the likelihood of syllable $S_{Ci}$ of the candidate and syllable $S_E$ of the recognized erroneous character is obtained from the confusion matrix;

Step 303: whether the likelihood obtained from the confusion matrix is greater than a threshold $S_{lim}$ or not is judged, if the judgment result is less than $S_{lim}$, this candidate is removed from the candidate list, and performing the Step 302 for the next candidate;

Step 304: if the judgment result is that the likelihood obtained from the confusion matrix is greater than or equal to $S_{lim}$, this candidate is remained as a member in the candidate list to be displayed to the user, and performing the Step 302 for the next candidate;

Step 305: after the above steps are completed for all the candidates in the candidate list $C=\{C_1, C_2 \ldots C_n\}$, the candidates remained in the candidate list are displayed to the user.

When "世" is decoded as "是", for example, in a certain speech recognition process, we input the stroke "-" by means of the stroke-based input method in order to correct the error, at this time:

C = {一 厂 丁 二 七 十 才 寸 土 世}

If the acoustic information is not used, the correct character "世" is in the last position, and the candidate list will be displayed as follows to the user via the processing of the above Step 301–305:

C = {十 土 世}

Thereby, it is seen that the error correction efficiency can be improved by means of the acoustic information.

In addition, we can use the language model (LM) to restrict the candidate list further. To use LM to prune the candidate list, we note that since an error is assumed to occur in a discrete word input environment, we only need to consider the unigram word language model. In other words, we simply incorporate the single word frequency in the evaluation and ordering of active candidates. We also recommend the weighting of acoustic and language models, and the reduced weight on the language model will be more robust with an unfamiliar topic.

In addition, with a stroke based input, the set of all covered characters are organized as a tree according to the stroke or stroke type sequence. When strokes (stroke types) are input sequentially, the system will trace the tree and keep only the candidates hanging off the particular branch it has traced to be active. The combined acoustic (confusion matrix) and language models will be used to rank the current active candidates and order them according to their overall likelihood value.

The effectiveness of such acoustically aided stroke inputs may be evaluated as follows. When a stroke/stroke type input system is used independently without the aid of any a priori acoustic information, it takes an average of 5.36 strokes to narrow the set of 6763 commonly used characters down to a candidate list of 10 or under. When we use the character, word level language model to anticipate the likely multi-character words, the average effective number of strokes per character is reduced to 3.12.

When inputting strokes with the aid of a priori acoustic information, if we assume that 90% (or 60%) of the first Pin-Yin alphabet of the erroneous character is correct, then the average number of strokes for catching the top ten correct candidates in the candidate list is no more than 2.8 (or 3.7). If we assume that 90% (or 60%) of the vowel is correct, then the average stroke number to catch the correct candidate is no more than 2.5 (or 3.4). With both models working together (both consonant and vowel information used), the average stroke number reduces to no more than 1.0027.

If the a priori acoustic information is provided through the 100-length confusion matrix, while the speech machine cannot provide the correct character in top ten candidates, the stroke based input method is needed. If the 10–100 confusion set can cover 60% of correct candidates of the erroneous characters, our initial confusion matrix data lead to an estimate of the average stroke number to be 3.572. These numbers are obtained using the acoustic models together with a character level language model. With the word level prediction approach, the effective average number of strokes per character will then be further reduced. This figure is estimated to be 2.2–2.56.

If there are other erroneous characters in the error word, the confusion matrix of other erroneous characters will be used to provide, respectively, character candidates to be evaluated together with the language model. The effective average number of strokes per character may also be estimated.

Thereby, it is seen that the error correction efficiency of the speech recognition can be greatly improved by means of the acoustic information. A speech recognition system using such speech aided method to perform error correction is described as follows.

Figure 4:
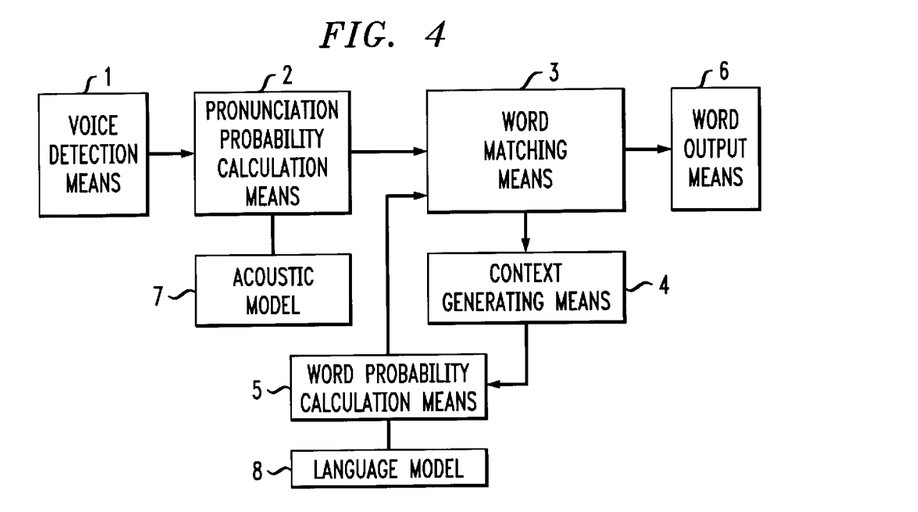
FIG. 4 is a schematic diagram of the composition of the prior art speech recognition system.

As shown in FIG. 4, a general speech recognition system consists of an acoustic model 7 and a language model 8. The acoustic model 7 includes the pronunciations of common words used in the recognized language. Such pronunciations are statistically summarized from the voices which are pronounced by most people in reading a certain word, and represents the general feature of this word. The language model 8 includes the use method of common words used in the recognized language.

The operation process of the continuous speech recognition system shown in FIG. 4 includes: a voice detection means 1 collects the user's speech, for example, representing the language as the speech sample, and sends such speech sample to a pronunciation probability calculation means 2. The pronunciation probability calculation means 2, for every pronunciation in the acoustic model 7, gives the probability estimation value of whether it is the same as the speech sample. A word probability calculation means 5, according to the language habits summarized from a great quantity of language materials, gives the probability estimation value of the word occurring in the current context for the language model 8. A word matching means 3 calculates a joint probability (which represents the possibility of recognizing the speech sample as this word) through combining the probability value calculated by the pronunciation probability calculation means 2 with probability value calculated by the word probability calculation means 5, and takes the word with the greatest joint probability value as the result of the speech recognition. A context generating means 4 modifies the current context by using the above recognition result, so as to be used by the recognition of the next speech sample. A word output means 6 outputs the recognized word.

Figure 5:
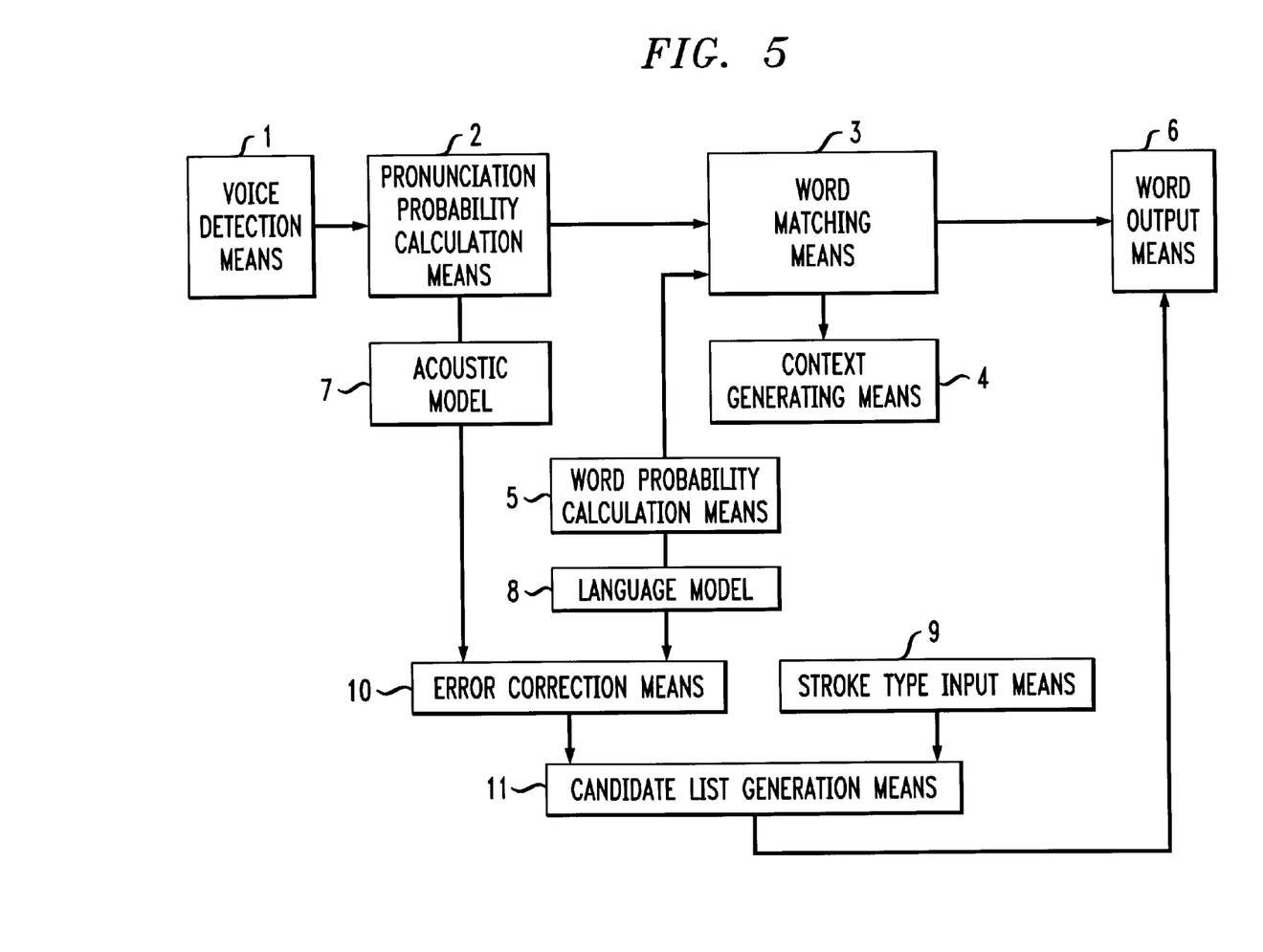
FIG. 5 shows a speech recognition system for correcting the error characters in the results of speech recognition according to an embodiment of the invention.

FIG. 5 shows a speech recognition system for correcting the error characters in the results of speech recognition according to an embodiment of the invention, in which system, the user inputs the correct characters by means of a stroke type based input means 9, and an error correction means 10, according to the acoustic model 7 and the language model 8, filters the candidate list generated by a candidate list generation means 11.

The stroke type based input means may be either a writing pad or an input stroke or stroke type means. There are several ways as follows to accomplish the stroke input with no additional hardware requirement:

1. Design a map of Chinese strokes or stroke types using a sub-area on the common computer keyboard for inputting strokes. Stroke types may be used for simplicity and reliability.

2. A virtual key set may be designed on the error correction screen.

3. A user may draw with the mouse to identify a desired stoke. A recognition system can be developed to recognize the complete set of strokes or stroke types.

4. Speech may be used to input strokes or stroke types.

Figure 6:
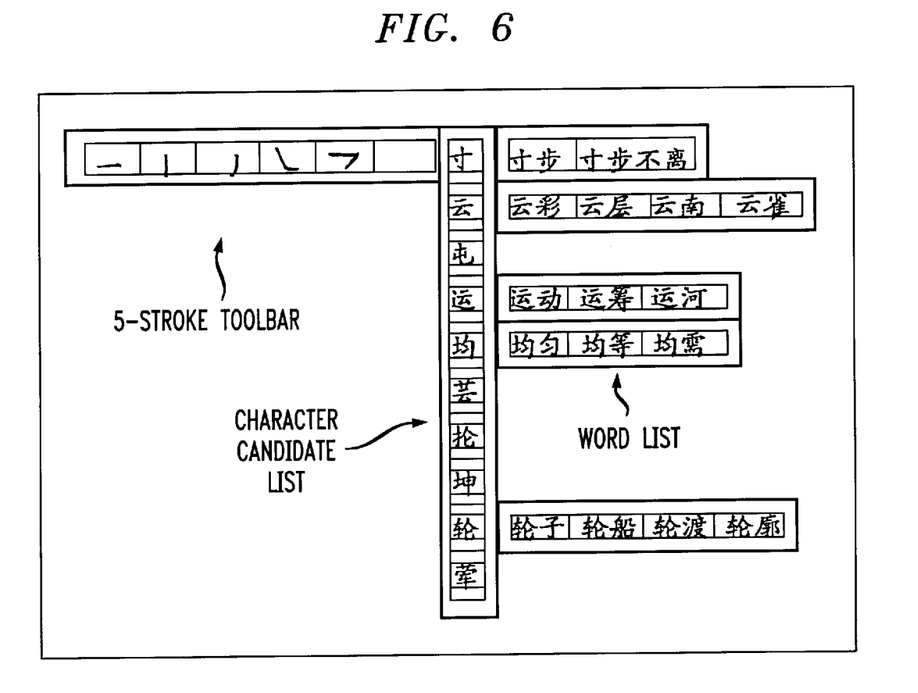
FIG. 6 is an error correction screen according to an embodiment of the invention.

In addition, during the error correction process for the speech recognition results, after the user marks an erroneous word, the candidate list will pop up upon request. We describe here a design of the error correction screen. As shown in FIG. 6, the error correction screen consists of a virtual keyboard for five stroke types and the candidate list on its right side. When the user begins to use the virtual keyboard to input stroke types, the candidate list right next to it will automatically be updated to show the new top candidates each time a stroke type is entered. This user interface which integrates candidate list and virtual stroke keyboard on the same screen will greatly improve the speed of the error correction.

It is to be appreciated that a speech recognition system for implementing the present invention, e.g., as shown in FIG.

5, may comprise a processor, for controlling and performing the methodologies described herein, a memory and a user interface, each coupled to the processor. The term "processor" as used herein is intended to include any processing device, such as, for example, one that includes a CPU (central processing unit) and/or other processing circuitry. For example, the processor may be a digital signal processor, as is known in the art. Also the term "processor" may refer to more than one individual processor. The term "memory" as used herein is intended to include memory associated with a processor or CPU, such as, for example, RAM, ROM, a fixed memory device (e.g., hard drive), a removable memory device (e.g., diskette), flash memory, etc. In addition, the term "user interface" as used herein is intended to include, for example, one or more input devices, e.g., any of the input means described herein, for inputting data to the processing unit, and/or one or more output devices, e.g., CRT display and/or printer, for providing results associated with the processing unit.

Accordingly, computer software including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU. In any case, it should be understood that the elements illustrated in FIG. 5 may be implemented in various forms of hardware, software, or combinations thereof, e.g., one or more digital signal processors with associated memory, application specific integrated circuit(s), functional circuitry, one or more appropriately programmed general purpose digital computers with associated memory, etc. Given the teachings of the invention provided herein, one of ordinary skill in the related art will be able to contemplate other implementations of the elements of the invention.

Accordingly, a method for correcting the error characters in the results of speech recognition and a speech recognition system having the error correction function according to the invention is described above in conjunction with the particular embodiment. It is apparent for those skilled in the art that various modifications can be made to the invention without departing from the spirit of the invention, which directs to include all these modifications and changes, and the scope of which is defined by the appending claims.

What is claimed is:

1. A method for correcting one or more error characters in results of speech recognition, the method comprising the steps of:
   marking the one or more error characters in the speech recognition results;
   inputting one or more correct characters corresponding to the one or more marked error characters by input based on character-shape;
   recognizing the input based on character-shape;
   displaying one or more candidate characters; selecting one or more desired characters from the one or more candidate characters in accordance with the user; and
   replacing the one or more error characters with the one or more selected characters;
   the method characterized by further comprising the step of filtering the one or more candidate characters in accordance with acoustic information associated with the one or more error characters.

2. The method of claim 1, wherein the speech recognition is Chinese speech recognition, and the characters are Chinese characters, Chinese words or the combination thereof.

3. The method of claim 1, wherein the acoustic information associated with the one or more error characters is obtained from the user's dictation of a speech recognition phase.

4. The method of claim 1, wherein the acoustic information of the one or more error characters is obtained from the user's dictation of an error correction phase.

5. The method of claim 1, wherein the acoustic information is an acoustic model from a confusion matrix.

6. The method of claim 5, wherein the acoustic model cooperates with a language model of a character or a word level to filter the one or more candidate characters.

7. The method of claim 1, wherein the one or more candidate characters are organized as a tree, and the tree is pruned by the acoustic information.

8. The method of claim 7, wherein the acoustic information is an acoustic model from a confusion matrix.

9. The method of claim 8, wherein the acoustic model cooperates with a language model of a character or a word level to prune the tree.

10. The method of claim 1, wherein the one or more candidate characters are integrated with a virtual stroke keyboard on a display screen.

11. A speech recognition system capable of correcting one or more error characters in results of speech recognition, the system comprising:
    voice detection means for collecting a speech sample of a user;
    pronunciation probability calculation means, which, for each pronunciation in an acoustic model, gives a probability estimation value of whether the pronunciation is the same as the speech sample;
    word probability calculation means, which, according to a language model, gives a probability estimation value of a word occurring in a current context;
    word matching means for calculating a joint probability through combining a probability value calculated by the pronunciation probability calculation means with a probability value calculated by the word probability calculation means and taking the word with the greatest joint probability value as the result of the speech recognition;
    context generating means for modifying the current context by using the speech recognition result; and,
    word output means;
    the speech recognition system characterized by further comprising error correction means, user marking the one or more error characters in the results of the speech recognition via the error correction means, inputting one or more correct characters corresponding to the one or more error characters by input based on characters-shape, and the error correction means recognizing the input, generating one or more candidate characters and filtering the one or more candidate characters via acoustic information associated with the one or more error characters.

12. The system of claim 11, wherein the speech recognition is Chinese speech recognition, and the characters are Chinese characters, Chinese words or the combination thereof.

13. The system of claim 11, wherein the acoustic information associated with the one or more error characters is obtained from the user's dictation of a speech recognition phase.

14. The system of claim 11, wherein the acoustic information associated with the one or more error characters is obtained from the user's dictation of an error correction phase.

15. The system of claim 11, wherein the acoustic information is an acoustic model from a confusion matrix.

16. The system of claim 15, wherein the acoustic model cooperates with a language model of a character or a word level to filter the one or more candidate characters.

17. The system of claim 11, wherein the one or more candidate characters are organized as a tree, and the tree is pruned by the acoustic information.

18. The system of claim 17, wherein the acoustic information is an acoustic model from a confusion matrix.

19. The system of claim 18, wherein the acoustic model cooperates with a language model of a character or a word level to pruned the tree.

20. The system of claim 11, wherein the one or more candidate characters are integrated with a virtual stroke keyboard on a display screen.

21. Apparatus for correcting one or more error characters in results of speech recognition, the apparatus comprising:

at least one processor operative to: (i) mark the one or more error characters in the speech recognition results; (ii) input one or more correct characters corresponding to the one or more marked error characters by input based on character-shape; (iii) recognize the input based on character-shape; (iv) display one or more candidate characters; (v) select one or more desired characters from the one or more candidate characters in accordance with the user; and (vi) replace the one or more error characters with the one or more selected characters; (vii) the apparatus characterized by the at least one processor being further operative to filter the one or more candidate characters in accordance with acoustic information associated with the one or more error characters.

22. An article of manufacture for correcting one or more error characters in results of speech recognition, comprising a machine readable medium containing one or more programs which when executed implement the steps of:

marking the one or more error characters in the speech recognition results;

inputting one or more correct characters corresponding to the one or more marked error characters by input based on character-shape;

recognizing the input based on character-shape;

displaying one or more candidate characters;

selecting one or more desired characters from the one or more candidate characters in accordance with the user; and replacing the one or more error characters with the one or more selected characters;

the article of manufacture characterized by further comprising the step of filtering the one or more candidate characters in accordance with acoustic information associated with the one or more error characters.

* * * * *

UNITED STATES PATENT AND TRADEMARK OFFICE
CERTIFICATE OF CORRECTION

PATENT NO.    : 6,513,005 B1
DATED         : January 28, 2003
INVENTOR(S)   : Y. Qin et al.

It is certified that error appears in the above-identified patent and that said Letters Patent is hereby corrected as shown below:

Column 5,
Line 15, please change $$\text{`` } Rank\ P(S_{HE}H|C)\frac{P(C)}{P(S_{HE}H)} = Rank\ P(S_{HE}|C)P(H|C)P(C) \qquad (1) \text{ ''}$$

$$= Rank\ \frac{P(C|S_{HE})P(C|H)}{P(C)}$$

to $$\text{-- } Rank\ \frac{P(S_{HE}H|C)P(C)}{P(S_{HE}H)} = Rank\ P(S_{HE}|C)P(H|C)P(C) \text{ --}$$

$$= Rank\ \frac{P(C|S_{HE})P(C|H)}{P(C)} \qquad (1)$$

Column 6,
Line 1, please delete "suitable for losing" and insert -- listing --.

Column 8,
Line 50, please delete "stoke" and insert -- stroke --.

Signed and Sealed this

Eighth Day of April, 2003

JAMES E. ROGAN
*Director of the United States Patent and Trademark Office*